United States Patent [19]

West

[11] Patent Number: 5,785,288
[45] Date of Patent: Jul. 28, 1998

[54] QUICK MOUNT FOR PARKING BRAKE ACTUATOR

[75] Inventor: Frank Thomas West, Macomb Township, Mich.

[73] Assignee: Dura Automotive Systems, Rochester Hills, Mich.

[21] Appl. No.: 698,966

[22] Filed: Aug. 16, 1996

[51] Int. Cl.⁶ .................................................. B62D 25/14
[52] U.S. Cl. ........................... 248/220.41; 248/222.51; 248/243; 248/300
[58] Field of Search ......................... 248/300, 220.31, 248/220.41, 220.42, 222.52, 243, 247, 248; 296/70, 74

[56] References Cited

U.S. PATENT DOCUMENTS

| | | | |
|---|---|---|---|
| 2,477,735 | 8/1949 | Gentile | 248/220.31 |
| 2,588,951 | 3/1952 | Anstett | 248/222.51 X |
| 3,503,641 | 3/1970 | Fraser | 248/222.11 X |
| 4,219,175 | 8/1980 | Harig | 248/243 X |
| 4,575,164 | 3/1986 | Pinnow et al. | 248/243 X |
| 5,221,067 | 6/1993 | Burchell et al. | 248/222.51 |
| 5,346,166 | 9/1994 | Valiulis | 248/220.41 |

FOREIGN PATENT DOCUMENTS

| | | | |
|---|---|---|---|
| 258524 | 11/1967 | Australia | 248/220.31 |
| 2240992 | 3/1974 | Germany | 248/222.51 |

*Primary Examiner*—Derek J. Berger
*Attorney, Agent, or Firm*—David A. Greenlee

[57] ABSTRACT

A parking brake actuator housing is easily installed to a vehicle panel in four steps. The legs of spaced housing mounting brackets are first inserted into panel apertures until abutments on the brackets engage the aperture edges. The housing is swung toward the panel on bracket bearing surfaces to compress bracket spring fingers and engage first bracket shoulders with the panel underside. The housing is then slid on the panel until other bracket abutments engage the opposite aperture peripheries, and spaced second bracket shoulders engage the panel underside. This action aligns a housing flange hole with a mating hole in a panel boss, enabling insertion of a fastener. The panel is clamped between the spaced bracket shoulders and the spring fingers and/or bracket bearing surfaces.

2 Claims, 4 Drawing Sheets

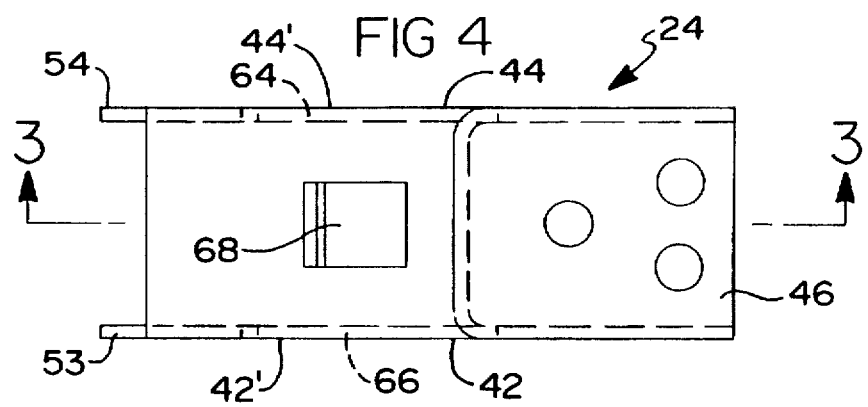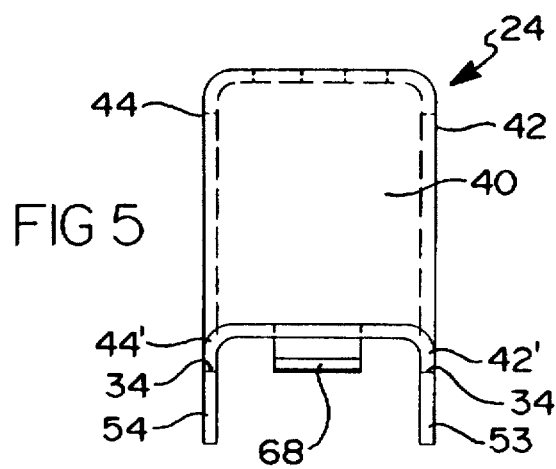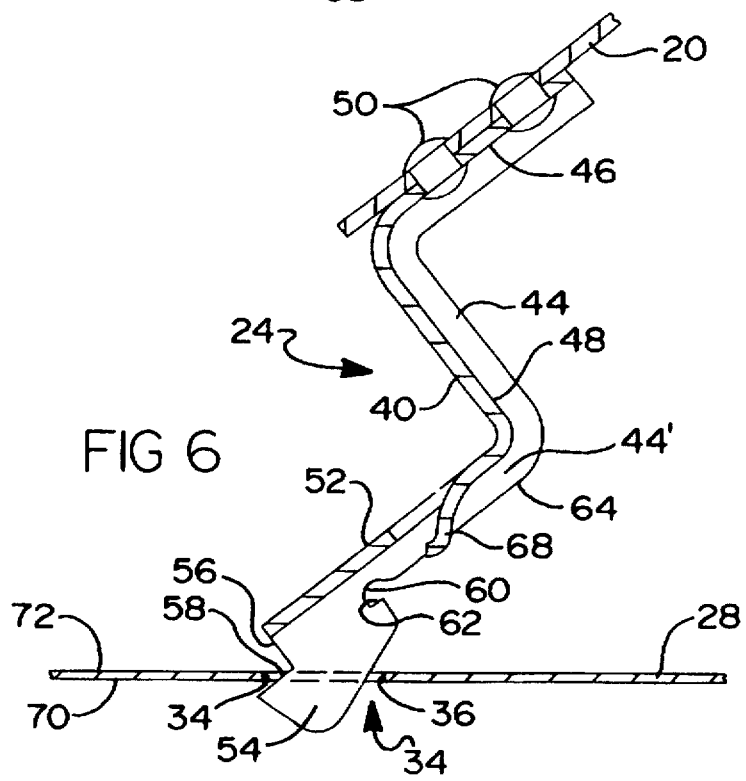

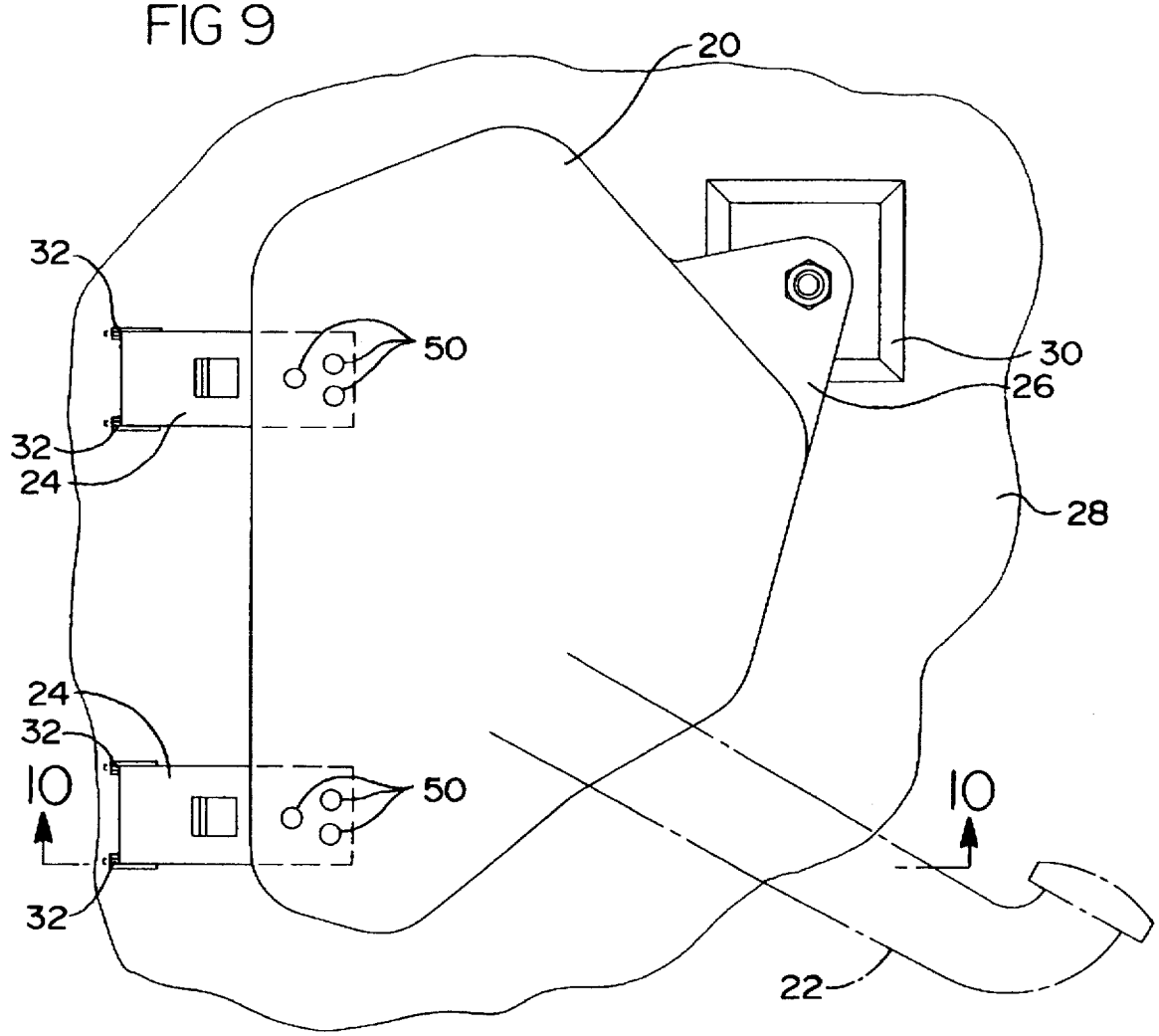
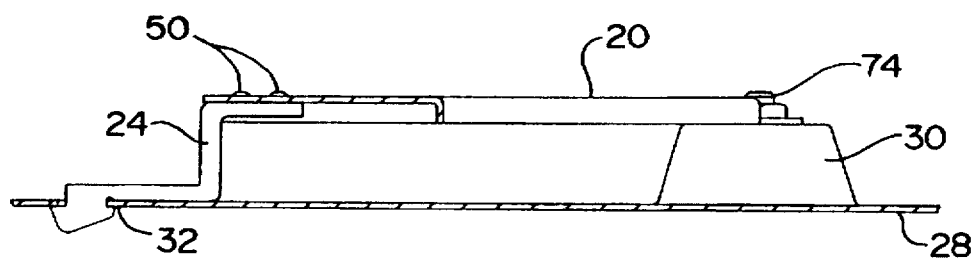

QUICK MOUNT FOR PARKING BRAKE ACTUATOR

BACKGROUND OF THE INVENTION

This invention relates generally to parking brake actuators and, more particularly, to an arrangement for expediting the mounting of a parking brake actuator in a vehicle.

Pedal-operated parking brake actuators are in common use in automotive vehicles and comprise a mechanism having a pedal which is depressed to operate a mechanism that tensions a cable to apply the vehicle's parking brake. The actuator is usually mounted beneath the instrument panel for operation by the left foot of the driver. The actuator conventionally has a housing that is bolted in three places to a sheet metal panel.

Installation of the parking brake actuator conventionally requires a worker to orient the actuator to receive three separate bolts inserted through holes in the sheet metal, and then to apply nuts to the bolts.

It would be desirable to provide a parking brake actuator which expedites mounting to a vehicle.

SUMMARY OF THE INVENTION

It is therefore an object of this invention to provide a parking brake actuator which expedites mounting to a vehicle.

In one aspect, this invention features a parking brake actuator attachment for attaching a parking brake actuator housing to a vehicle panel, which comprises a mounting aperture formed in the vehicle panel and defined by opposed peripheral edges, a mounting bracket secured to one end of the housing. The bracket comprises a bearing surface for engaging one side of the vehicle panel, a spring finger depending below the bearing surface, and a leg extending below the bearing surface and having spaced first and second shoulders opposing the bearing surface for engaging the other side of the vehicle panel. Cooperating fastening means on the vehicle panel and the other end of the housing receive a fastener to secure the housing to the vehicle panel after mounting. The housing is mounted to the vehicle panel by inserting the depending leg through the mounting aperture to engage the first shoulder with the peripheral edge. The other end of the housing is swung toward the panel to engage the spring finger with the one side of the panel, stress the spring finger, and engage the first shoulders with the other side of the vehicle panel adjacent the one edge. The housing is slid on the vehicle panel to engage the second shoulder with the other side of the panel adjacent the other peripheral edge and engage the cooperating fastening means. A fastener is applied to the fastening means to lock the housing to the vehicle panel.

In another aspect, this invention features a mounting bracket having a base attached to the housing, and an arm extending from the base and mounting the bearing surface, spring finger and depending leg.

In yet another aspect, the attachment of this invention features a vehicle panel having two of said mounting apertures, an arm including a pair of spaced flanges which bracket the spring finger, and each flange including a bearing surface and a leg for insertion into a panel aperture.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 4 is a top view of the mounting bracket of FIG. 3;

FIG. 5 is an end view of the mounting bracket of FIG. 4;

FIG. 6, 7 and 8 are sequential sectional detail views illustrating a mounting bracket being inserted into a mounting aperture to mount a parking brake actuator housing to a vehicle panel;

FIG. 9 is similar to FIG. 1, but illustrating a parking brake housing mounted on a vehicle panel; and FIG. 10 is a sectional view taken along line 10—10 of FIG. 9.

DETAILED DESCRIPTION OF A PREFERRED EMBODIMENT

Figure 1:
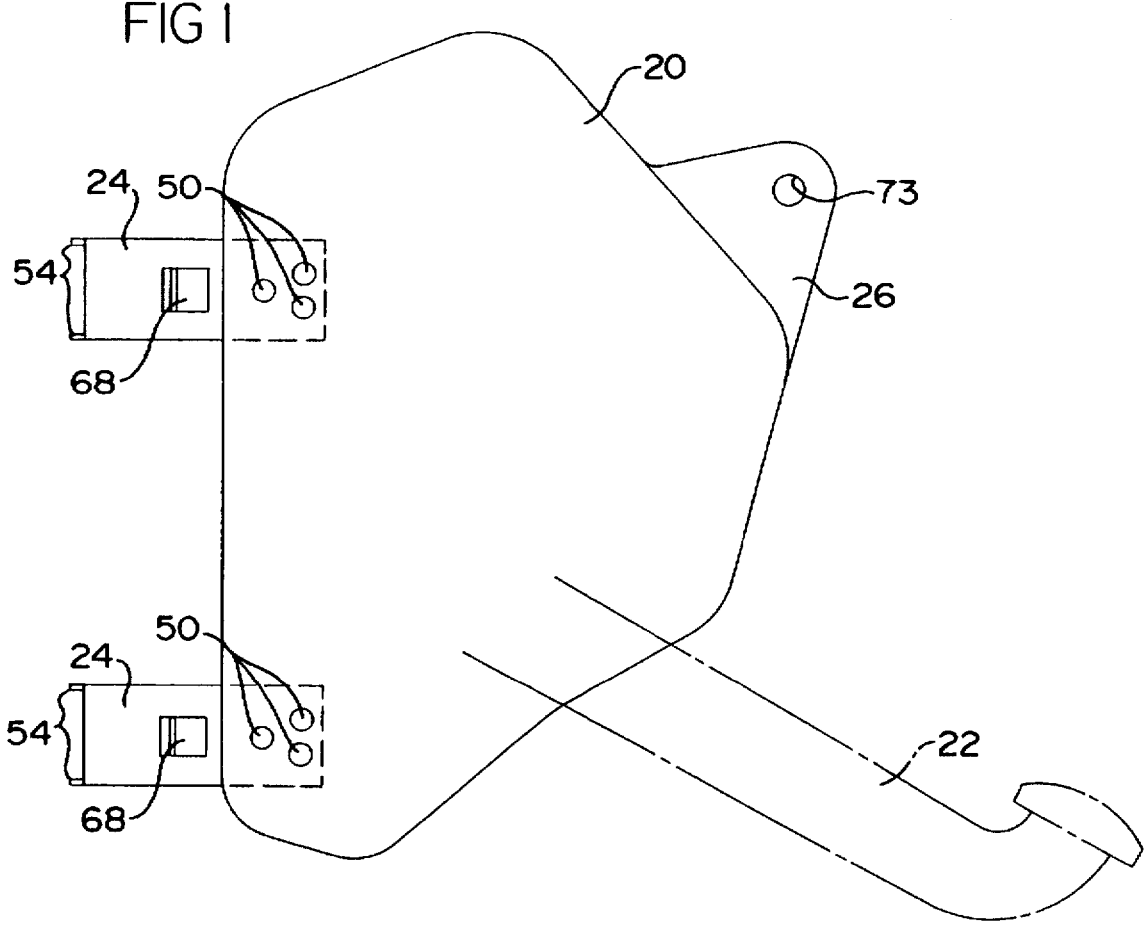
FIG. 1 is a side view of a parking brake actuator housing having mounting brackets according to this invention.
Figure 2:
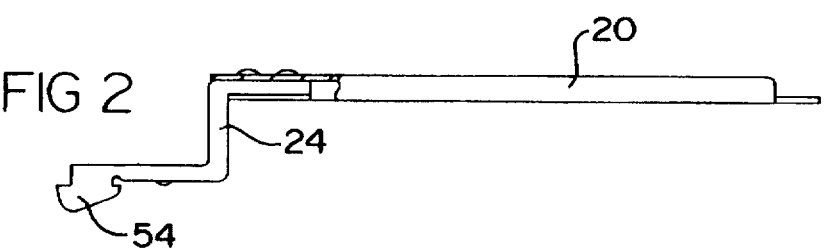
FIG. 2 is a top view of the housing of FIG. 1.
Figure 3:
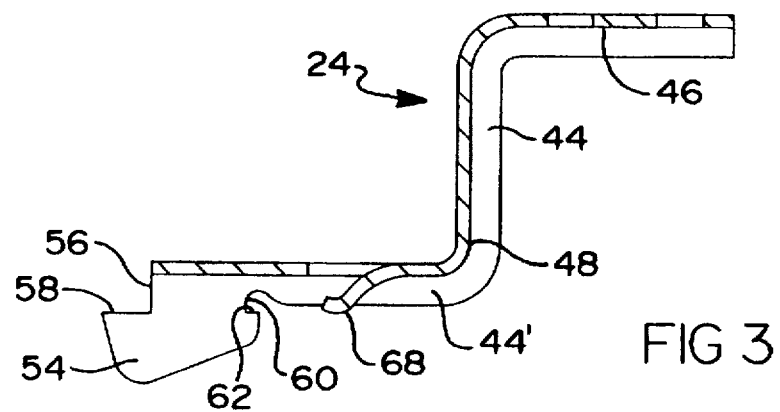
FIG. 3 is an enlarged sectional view of one of the mounting brackets shown in FIG. 1, taken along line 3—3 of FIG. 4.

Referring to FIGS. 1, 9 and 10, a housing 20 for a parking brake actuator (only the parking brake actuator pedal 22 is shown in phantom lines) has a pair of mounting brackets 24 secured to one end and a mounting flange 26 formed on its other end. A vehicle panel 28 includes a raised mounting boss 30 and spaced pairs of mounting apertures 32. Each aperture 32 is an elongated narrow slit that is defined by panel peripheral edges, including a front edge 34 and a rear edge 36, as best seen in FIGS. 6-8.

As shown in FIGS. 3-6, each bracket 24 is a steel channel 40 having depending flanges 42 and 44. Channel 40 is bent into a base 46 and an L-shaped arm 48, and is attached to housing 20 by rivets 50. The flanges 42', 44' of the bottom portion 52 of arm 48 terminate in depending legs 53, 54 which are substantially identical. Each leg defines a first abutment 56, a first front shoulder 58, a second abutment 60, and a second rear shoulder 62. The bottoms of the flanges 42, 44 of arm bottom portion 52 form bearing surfaces 64 and 66. A spring finger 68 is lanced from bottom portion 52 between flanges 42', 44' so that its tip extends below bearing surfaces 64 and 66.

Figure 7:
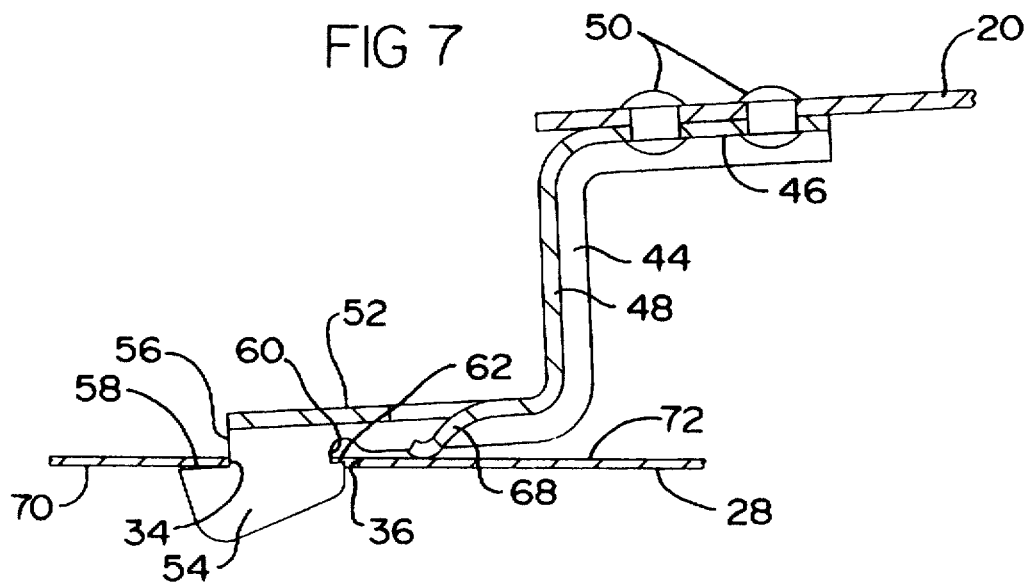
Figure 8:
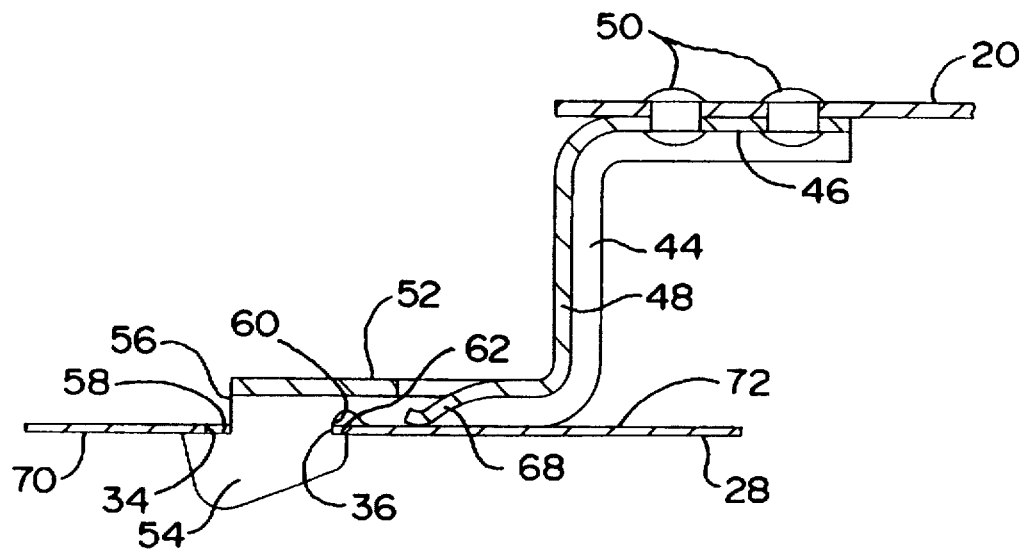

FIGS. 6-8 sequentially illustrate the mounting of housing 20 to panel 28. The legs 54 of both mounting brackets 24 are inserted into apertures 32 until abutments 56 engage peripheral edge 34. Housing 20 is then swung toward panel 28 to engage shoulder 34 with the panel underside 70 and engage spring finger 68 with the panel top side 72 (FIG. 7). Housing 20 is then slid rightward on bearing surfaces 62, while stressing spring finger 68, to enable shoulder 62 to slip under panel 28 until abutment 60 engages aperture peripheral edge 36 (FIG. 8).

This action will align the mating hole 73 in mounting flange 26 and panel boss 30 (not shown) to enable a fastener 74, such as the illustrated bolt and nut, to be inserted. These holes and fastener 74 comprise fastening means which install housing 20 to panel 26, as shown in FIGS. 9 and 10. Note that leg front shoulders 58 are longer than rear shoulders 62 to assure engagement of the front shoulders 58 with the panel underside 70 after housing 20 is slid rightward to engage rear shoulders 62. As a result, panel 28 is clamped between shoulders 58, 62 and spring fingers 68 and/or bearing surfaces 64.

Thus, this construction enables the parking brake actuator mounted on housing 20 to be easily installed to vehicle panel 28 in three steps by simply (1) inserting the bracket legs, (2) sliding the housing on the panel, and (3) mounting the fastening means.

While only a preferred embodiment has been illustrated and described, obvious modifications thereof are contemplated within the scope of this invention and the following claims.

I claim:

1. In a vehicle having a panel and a parking brake actuator housing, a parking brake actuator attachment for attaching the parking brake actuator housing to the vehicle panel, comprising

- a pair of spaced mounting apertures formed in the vehicle panel, each defined by opposed peripheral edges,
- a mounting bracket secured to one end of the housing, comprising
  - a base attached to the housing and having an arm extending from the base,
- a pair of spaced flanges on the arm each having a bearing surface for engaging one side of the panel,
  - a spring finger depending from the arm between the flanges and extending below the bearing surface for engaging the one side of the panel and being stressed thereby,
  - a depending leg extending from each flange below the bearing surface, each leg including spaced first and second shoulders opposing the bearing surface and first and second abutments adjacent the first and second shoulders, the first shoulders engaging the other side of the vehicle panel when the legs are inserted through the apertures until the first abutments engage one peripheral edge, and the second shoulders engaging the other side of the panel when the housing is slid on the panel until the second abutments engage the other peripheral edge which depresses the spring finger, and

- cooperating fastening means on the vehicle panel and the other end of the housing, which are aligned upon engagement of the second abutments with the other peripheral edges, for receiving a fastener to secure the housing to the vehicle panel.

2. The parking brake actuator attachment of claim 1, further including a second pair of spaced mounting apertures spaced from the first said pair of mounting apertures, and a second mounting bracket secured to the one end of the housing spaced from the first mounting bracket for insertion into the second pair of mounting apertures.

* * * * *